(12) United States Patent
Peale et al.

(10) Patent No.: US 7,433,047 B1
(45) Date of Patent: Oct. 7, 2008

(54) RUNOUT CHARACTERIZATION

(75) Inventors: David R. Peale, San Diego, CA (US);
Dieter E. Mueller, Cupertino, CA (US);
Kyle A. Brown, San Diego, CA (US)

(73) Assignee: KLA-Tencor Corporation, San Jose, CA (US)

( * ) Notice: Subject to any disclaimer, the term of this patent is extended or adjusted under 35 U.S.C. 154(b) by 131 days.

(21) Appl. No.: 11/675,947

(22) Filed: Feb. 16, 2007

(51) Int. Cl.
*G01B 11/02* (2006.01)
(52) U.S. Cl. ..................................... 356/498
(58) Field of Classification Search ............... 356/450, 356/496, 498; 382/124
See application file for complete search history.

(56) References Cited

U.S. PATENT DOCUMENTS

| | | | |
|---|---|---|---|
| 3,947,128 A * | 3/1976 | Weinberger et al. | 356/71 |
| 6,556,941 B2 | 4/2003 | Mallory et al. | |
| 2008/0063245 A1 * | 3/2008 | Benkley et al. | 382/124 |

* cited by examiner

*Primary Examiner*—Michael A Lyons
(74) *Attorney, Agent, or Firm*—Luedeka, Neely & Graham, P.C.

(57) ABSTRACT

Runout characterization is performed on a moving body by positioning a light source and optical sensor at a nominal distance from the moving body, with a beam directed from the light source against a surface of the moving body. The reflected light is detected at a sampling rate with the optical sensor as the moving body moves, and a data stream of the measurements over time is stored. In the case where an interferometer is used as the optical sensor, relative distance measurements are made. The data stream is analyzed to detect repeating signatures in the data stream, where the signatures represent features on the surface of the moving body. At least one of the features is selected as a reference, and the data stream is processed into segments based on the reference, where each segment represents one period of motion of the moving body. The data segments are overlaid on top of each other to produce ordered sets of data points within the segments. Each ordered set of data points is individually averaged and reported as repeatable runout. The average of each ordered set of data points is subtracted from the data points of each set to produce normalized ordered sets of data points. The variances within the normalized ordered sets of data points are reported as a measure of the non-repeatable runout of the moving body.

41 Claims, 5 Drawing Sheets

RUNOUT CHARACTERIZATION

FIELD

This invention relates to the field of measurement of moving objects. More particularly, this invention relates to measuring the repeatable runout and the non-repeatable runout components of moving objects with a relatively high degree of resolution and sensitivity.

BACKGROUND

In precision machine motion, the deviation from the ideal motion path is called runout. For linear motions, the ideal path is typically a straight line. Displacements and angular pitching of the moving stage from this straight path represent runout from the ideal path. In rotational applications, the typical ideal path is a perfect circle relative to a defined axis. In this case, eccentricity of the circular motion, angular wobble of the axis, and distortions of the circular shape of the motion represent runout from the ideal path. Examples of such devices are air bearing spindles, hard disk drive bearing spindles, motors, and shafts.

Measuring runout is an important step towards improving precision machine motion. For example, the tighter track spacings demanded by the increase in the capacity of hard disk drives requires less runout in the rotation bearings in the disk drives. Less runout also allows disk drives to operate with higher throughputs.

Runout has two commonly measured components. First, (in rotating applications) repeatable runout (RRO) is the deterministic motion that occurs on every revolution of a rotating body, (or each pass of a translating body in linear applications). Repeatable runout can be caused, for example, by a rotating disk that is not absolutely round, or which is mounted slightly off-center, or by the nicks and chips at the edge of the rotating body. Non-repeatable runout (NRRO), on the other hand, is the stochastic component of the motion, and can be caused by such things as excessive drive vibration, play in the bearings, imperfectly shaped bearing balls, turbulence in fluid bearing films, or contamination in or on the bearing surfaces, Runout is measured with sensitive instruments that detect the position of a moving object, such as the edge of a rotating disk. One sensitive instrument commonly used to measure runout is the capacitance probe, which is also referred to as a capacitance gauge. The small overall size of the capacitance probe relative to other measurement candidates allows it to be positioned in confined spaces, such as inside the housing of small disk drives or in a track on a linear translation stage.

Using a rotating disk as an example, a sequence of measurements is made on a time-lapsed basis at a number of points on the surface as it rotates. The rotational position of the object can be determined by triggering a clock with an external encoder, or from an electrical signal provided by the motor driver (motor commutation).

The choice of size of the capacitance probe tip represents a trade-off between resolution in the direction of motion and sensitivity of the measurement itself. The finite probe tip size and limited bandwidth of capacitance probes limits one's ability to adequately resolve the spatial topography of the surface at the rotational speeds at which modern bearings are operated. The electrical response time of the capacitance probe limits the meaningful maximum acquisition rates to between ten thousand and one hundred thousand samples per second. Thus, a capacitance probe will always suffer from a limited lateral resolution. For slow rotation speeds or slow linear stage feeds the lateral resolution is hampered by the finite probe tip size, and in the case of fast rotation speeds the lateral resolution suffers from the limited capacitance probe bandwidth.

What is needed, therefore, is a system that overcomes problems such as those described above, at least in part.

SUMMARY

The above and other needs are met by a method of measuring the runout of a moving body by positioning an optical source and sensor at a larger standoff distance from the moving body, with a beam directed from the source against a surface of the moving body and a spot size ranging from a few microns in diameter to a few hundreds of microns depending on the surface to be measured and the spatial resolution needed. The relative distance from the source to the illuminated spot is determined by using an interferometer as the sensor or inferred from the reflectivity or an auxiliary proximity sensor.

With an interferometer, the relative distance to the test surface is measured at a high sampling rate while the moving body moves, and a data stream of the relative distances as a function of time is stored. Sampling rates of more than one hundred million samples per second are possible with optical sensors. The data stream is analyzed to detect repeating signatures in the data stream, where the signatures represent features on the surface of the moving body. At least one of the features is selected as a reference, and the data stream is divided into segments based on the reference, where each segment represents one period of motion of the moving body. The data segments are overlaid on top of each other to produce ordered sets of data points within the segments. Once features in the data sets are accurately aligned, the data can if needed be re-sampled through interpolation so that every data set has the same number of data points. This interpolation can be done using a variety of functional forms well known to those skilled in the art of signal processing. The full set of data points is averaged, and that average is subtracted from the data points of each set to produce new ordered sets of data points. The position variances within the new ordered sets of data points are indicative of the (form the basis for calculating) non-repeatable runout of the moving body.

When the speed of the moving body varies between repetitions, a constant time sampling measurement results in an irreproducible profile. An advantage of high sampling rates available with an interferometer is that this allows the surface profile to be resolved at a very short length scale. Multiple, distinct, short length-scale features within each data set can then be aligned so that the effects of speed variations even within one period of motion can be removed. Averaging and average subtraction can then be performed as described in the previous paragraph to produce the non-repeating portion of the motion.

In this manner, the present method uses autocorrelation techniques to accurately align the feature signatures on the surface that is being tested, so that an accurate comparison of surface heights can be made between each period of motion.

The interferometric sensor can be used directly on the edges and surfaces of real disks in hard drives, disk spindle motors and shafts, air bearings, and other rotating surfaces for measurements of rotational performance and disk motions.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
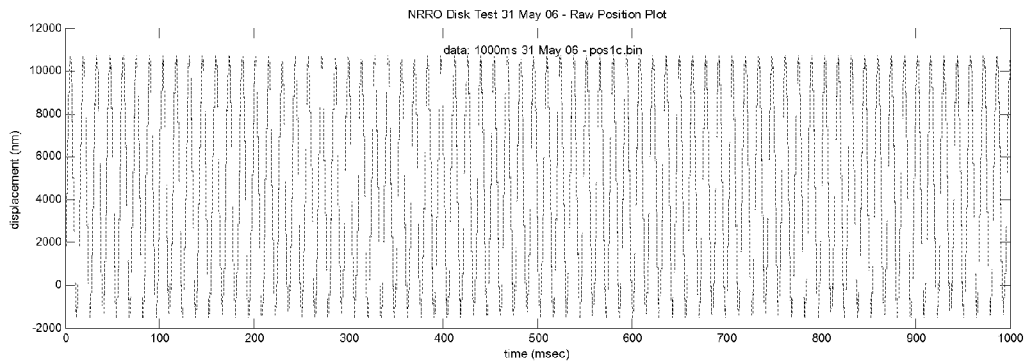
FIG. 1 is a plot of the measured total motion of a hard drive disk edge for several revolutions of the disk.

This invention relates to the use of electromagnetic radiation sources and detection systems in the process of measuring repeatable and non-repeatable linear and rotational runout. In the ensuing description, terms like light, optical, optics, and beams with reference to electromagnetic radiation will be used with no implication that the radiation is or is not in the visible portion of the spectrum. In the case of a rotating object, appropriate measurements are of the radial runout, axial runout, and axial axis wobble.

As previously mentioned, a commonly used instrument in runout characterization is the capacitance probe, due to its small size and sensitivity. However, capacitance probe noise levels in practical setups are twenty to thirty nanometers, peak-to-peak. This does not meet the present and future industry requirement for measurement capability of less than about five nanometers. Optical instrumentation, such as an interferometer, can be used to provide an order-of-magnitude improvement in signal-to-noise. This will be critical if hard drive manufacturers are to continue increasing the aerial storage density.

Sampling rates of over one hundred million samples per second are possible with optical instrumentation. This represents a three order of magnitude improvement over the capacitance probe capability. The higher sampling rate enables a three order of magnitude improvement in lateral resolution. Furthermore, the spot size is adjustable. The spot can be focused to be about three orders of magnitude smaller than the effective measurement area sampled with capacitance probes. These two improvements combine to improve the lateral resolution whether a surface is moving by quickly or slowly.

Using an acquisition trigger acquired through an existing method, a timed sequence of capacitance probe measurements can be made which begin at roughly the same point during each rotation. The trigger can be created using an encoder or an electrical signal provided by the motor driver. An alternative to the use of a trigger is to use a full period fitting algorithm after acquisition to locate the repeating profile in order to determine and align the position. With either method, a change in the speed of a moving body within one period results in a change in profile. A highly stable rotational speed is needed in these existing methods to ensure that every point on the bearing surface is accurately re-measured on each rotation of the surface. As accuracy requirements increase, the capacitance probe measurement technique has required better and better control of the rotation speed, which is presently at about three hundredths of a percent. This level of speed stability is at the limit of economic feasibility and is, therefore, undesirable.

Employing multiple triggers around a spindle helps to make the location of each measurement deterministic, but this technique is expensive and also limits the resolution (a high encoder density is still only five hundred and twelve measurements per rotation). Encoders are not present on production hard disk drive spindles.

Capacitance probes are typically placed in close proximity to the test surface, e.g. about one hundred to as little as twenty-five microns, to the surface under test in order to obtain useful signal-to-noise ratios. This small separation can lead to physical collisions with the test surface which cause damage to the measurement object and the sensor. In addition, the small standoff distance can lead to nonlinear responses from the capacitance probe when the runout motion is a significant fraction of the standoff distance. The use of optical instrumentation allows the apparatus to be farther away. The only limitations to how close or far you can be from the edge of the disk are the practical constraints of the setup, not fundamental constraints of the technology. The limitations on how close you can be are similar to the capacitance probe collision consideration. Farther away requires a larger lens and becomes impractical in a confined space. In a preferred embodiment the optical instrumentation is an interferometer, which produces distance information without the nonlinearity as a function of standoff distance inherent with the capacitance probe.

Because of the finite size of capacitance probes and the fact that the edges of real hard disks are rounded, capacitance probes lose additional sensitivity and may not be useful on the edges of such disks. This limits the measurements that can be made on real hard drives, drive bearings, and disks under realistic operating conditions. The small spot size enabled by optical instrumentation allows one to measure the runout on production disks even if they have a small radius of curvature, reducing reliance on surrogate test disks which add cost and operational complexity.

Figure 6:
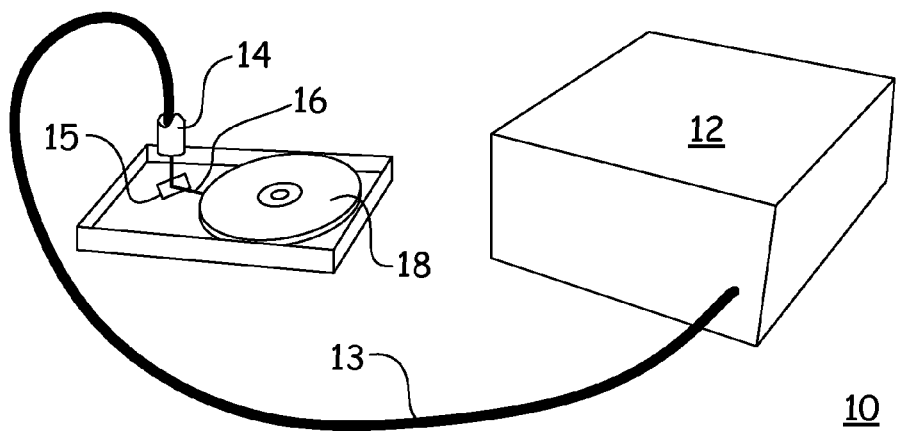
FIG. 6 depicts a test setup for non-repeatable runout measurements of a hard disk drive motor, using the edge of the disk.
Figure 7:
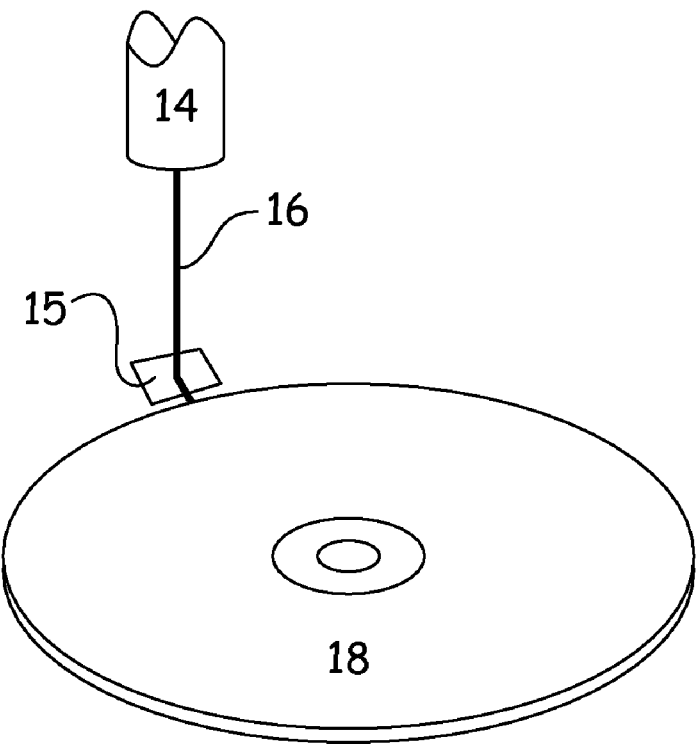
FIG. 7 depicts an enlarged portion of the forty-five degree mirror that directs the interferometer beam towards the disk edge so that the motion in the plane of the disk can be observed.
Figure 8:
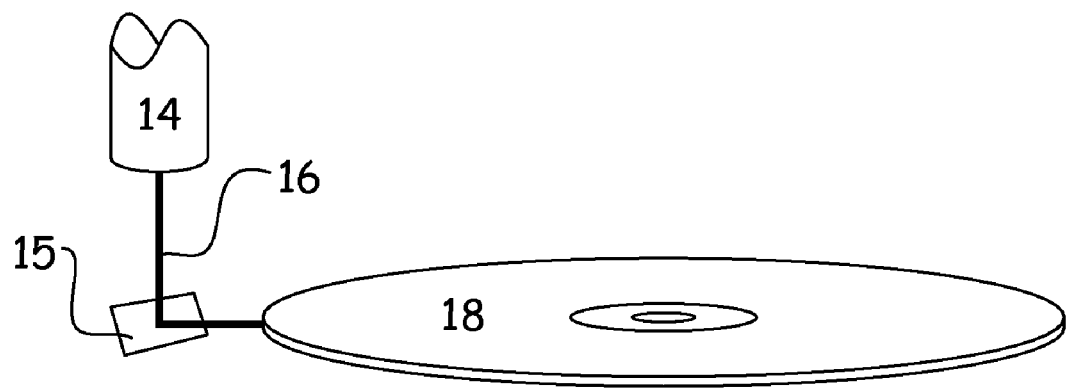
FIG. 8 depicts a side view of the interferometer sensor above the forty-five degree turning mirror, and the disk to the right of the turning mirror.
Figure 9:
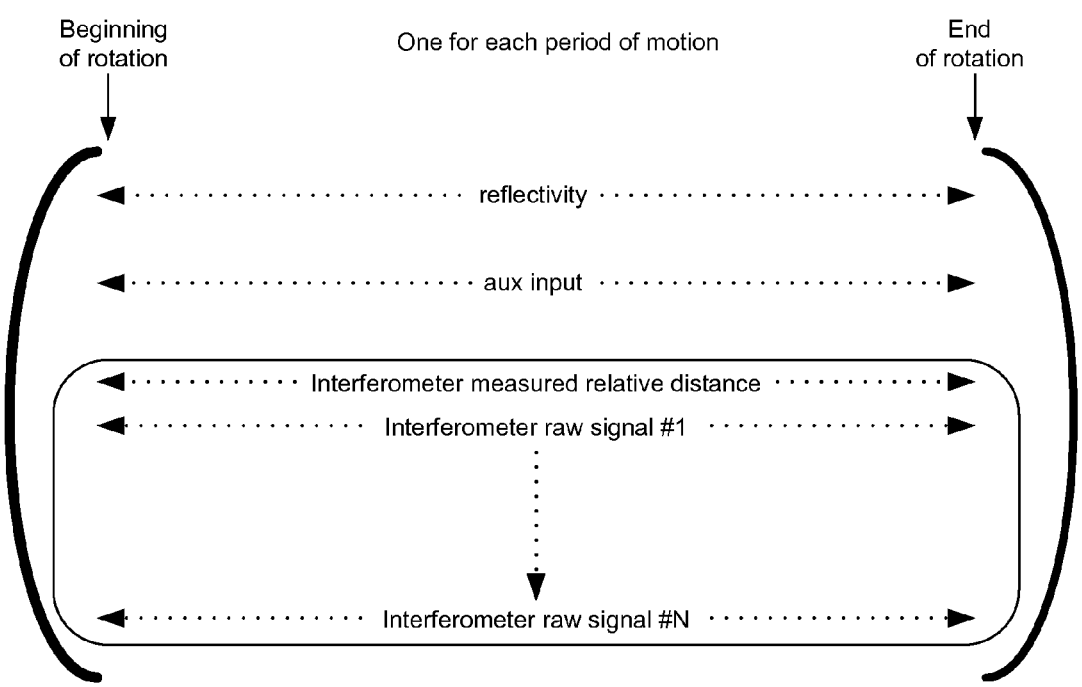
FIG. 9 visually describes the component parts that are used to construct the one-period arrays.

With reference now to FIG. 6, there is depicted a system 10 according to one embodiment of the present invention. The system 10 includes an optical source and detection system 12 that is optically coupled by a cable 13 to a sensor probe 14, which is depicted in greater detail in FIGS. 7 and 8. An adjustably angled mirror 15 (shown at approximately forty-five degrees) enables a change in the direction of the beam 16 that is emitted from the sensor probe 14, thus enabling more convenient access by the system 10 to the edge of disk 18, on which the system 10 is to be used. In a preferred embodiment of the system, the optical source and detection system together form an interferometer.

One embodiment of the invention is described herein with reference to measuring the runout of a hard disk drive. However, it is appreciated that this is exemplary and not limiting, and that other embodiments of the invention can be applied to other rotating and translating equipment. It is valuable to note that the system 10 as described herein has, in one embodiment, a beam 16 spot size that is sufficiently small so as to enable use of the system 10 on the edge of hard disk platter 18, without any modification thereto. This means that the system 10 can be used directly on production assemblies, and does not required modified or substitute test assemblies.

The sensor probe 14 can also be set at a convenient standoff distance (typically several millimeters) from the edge of the disk 18. This aspect of the system 10 also makes the use of the system 10 very convenient, as it is often impractical to get a sensor as close to the disk 18 as is required by a capacitance probe (typically 0.1 to 0.025 millimeters), without significant modification of the system being tested. However, in another embodiment the standoff distance from the sensor probe to the edge of the disk is less than ten millimeters. This configuration makes the spot size smaller and further improves the spatial resolution of the detection system while still using small optical components. To enable the smaller standoff distances, the disk would preferably be smooth and well centered, but could still have a small radius of curvature. The close proximity may or may not allow the use of a small adjustably angled mirror.

Once the system 10 is set up in the manner as suggested above, the disk 18 is activated and rotation of the disk 18 commences. The system 10 is also activated, and the system 10 starts collecting data from the moving edge of the disk 18. The system 10 records data indicative of local characteristics within and near the illuminated spot. This data is recorded over time, such as for many revolutions of the disk 18. Various embodiments of the present invention use either analog or digital data. However, by the time the data is analyzed, as described in more detail below, the preferred embodiments use digital data. In one embodiment, ten million data measurements are recorded each second of operation of the system 10. Of course, other sampling rates could also be used. In one embodiment, the local characteristics include reflectivity of the edge of the disk 18. In a preferred embodiment, the local characteristics include relative distance between the sensor 14 and the edge of the disk 18.

Methods in which the data can be separated by rotation will be discussed shortly with a concrete example. Generally speaking, the separation produces an array in time of every measured or derived quantity, which spans from the beginning to the end of a rotation (see FIG. 11). These will be called one-period arrays, and there are as many of these arrays as there are rotations. In one embodiment the one-period array has only a reflectivity component. In another embodiment the one-period array possesses an auxiliary input component (such as the output of a capacitance probe). In the case of slow auxiliary input measurement (such as a capacitance probe), the auxiliary input cannot be used for a sensitive rotational alignment. In such a case, the reflectivity signal would be used for alignment and the auxiliary input would be used to characterize runout.

In a preferred embodiment, an interferometer is used and the one-period arrays include at least two raw signal components ($N \geq 2$), plus a calculated relative distance component. These components are shown in the box of FIG. 11. When an interferometer is used, the reflectivity component of the one-period arrays can be calculated from the N raw signals. The auxiliary input is not necessary if an interferometer is used.

Figure 10:
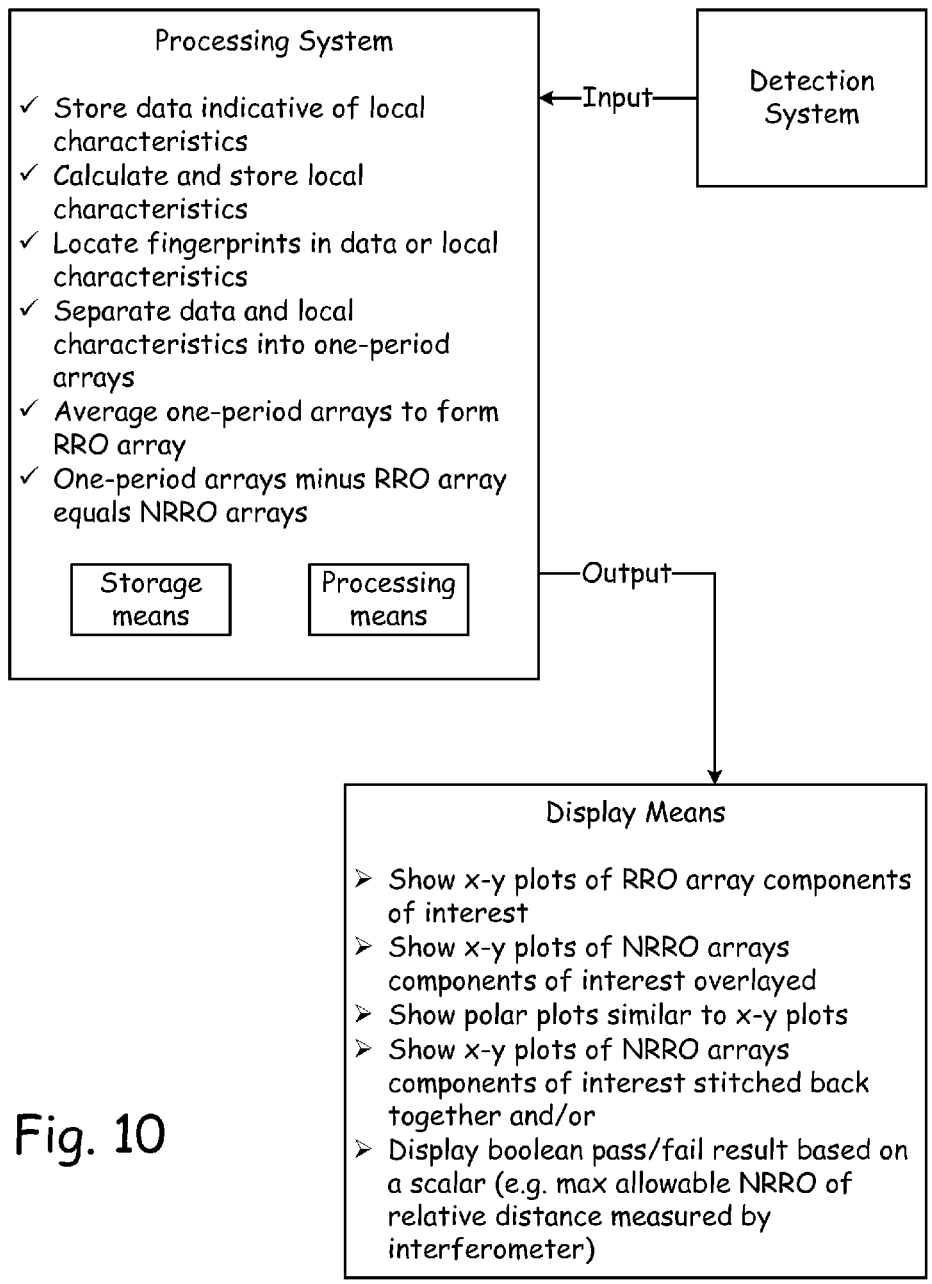
FIG. 10 is a functional block diagram of a system according to one embodiment of the present invention.

FIG. 10 shows the flow of information from the detection system, through the processing system, and out to the display. The data, firmware, and software can be stored in dynamic random access memory (DRAM), flash memory, on a hard or floppy disk, or any hybrid drive created by the above and other storage technologies. The raw data which comes from the detection system can be stored and processed. Alternatively, it could enter the storage means directly through a permanently or temporarily dedicated bus as in the case of direct memory access (DMA). Once processing has occurred, the data can then be stored as local characteristics or intermediate results along with scalar figures of merit and Boolean pass/fail determinations. Raw data, intermediate results, local characteristics, figures of merit and pass/fail status can then be displayed or tabulated in a variety of forms including graphical on a computer monitor or a lighted alarm in the case of a failure of the object under test, or in a report file or printout. The processing means could be a single or multi-core general purpose microprocessor, single or multi-core embedded microprocessor, field programmable gate array (FPGA), digital signal processor (DSP), or other processing technologies. The processing system could be comprised of multiple separate electronic boxes (e.g. one equipped with a DSP or an FPGA and a desktop computer) and each could perform a portion of the calculations.

In the following discussion, the local characteristic used to locate repeating signatures is relative distance. FIG. 1 depicts a graph of relative distance calculated from data collected during a sampling session. As can be seen along the vertical axis of the graph, the system 10 has, in this example, calculated a sequence of distance measurements that varied from a positive value of approximately eleven thousand nanometers to a negative value of approximately two thousand nanometers, yielding a range in values of approximately thirteen thousand nanometers. The trace on the graph represents changes in the distance from the sensor probe 14 to the edge of the disk 18 as measured by the system 10 as referenced to the distance at the start of the measurement. As can be seen, the distance changes according to a roughly sinusoidal pattern, indicating that the dominant contribution to the repeatable runout may be a result of eccentricity in the rotation of the disk 18. This large pattern is an indication of one type of repeatable runout in the disk 18. It is appreciated that the pattern may not be truly sinusoidal, and in other embodiments may have a completely different shape.

Figure 2:
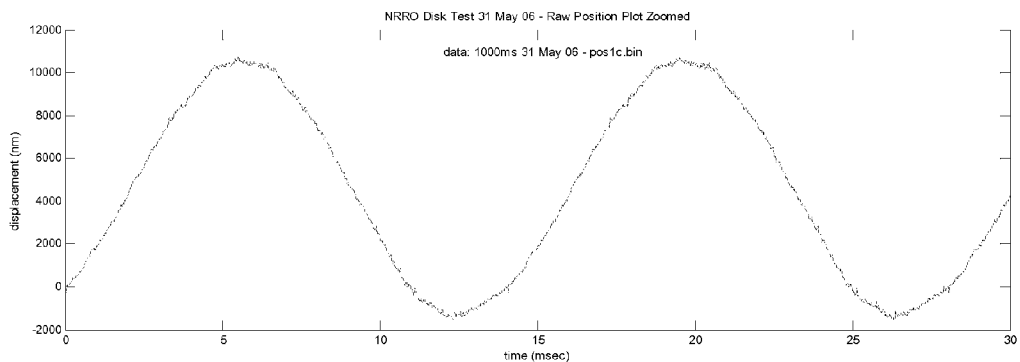
FIG. 2 is a plot of a zoomed portion of the same data in FIG. 1, showing the fuzzy hash, such as near the bottom of the curves, indicating the natural topography of the disk that is used for the autocorrelation method to match rotational position from rotation to rotation.

However, an enlargement of the time scale along the horizontal axis of the graph, as depicted in FIG. 2, shows that the large wave-form repeatable runout that is most clearly visible in FIG. 1 is not the only event being measured. FIG. 2 depicts a fuzziness in the trace of the sinusoidal wave. Repeating signatures can be seen. These repeating patterns are an indication of the system 10 detecting a single feature on the edge of the disk 18 as it passes by the sensor probe 14 on each revolution. This feature could be, for example, a pit, a bump, or any one or more of a number of other surface anomalies. Further, the feature could either be intrinsic to the disk 18—something that the disk 18 just happened to pick up along its life before being tested—or it could be a fiducial mark that was intentionally placed on the edge of the disk 18. The visible repetition of the small features in FIG. 2 indicates two things, (1) that the small features are not random noise and, (2) that the period of the pattern is the same as the period of one rotation of the disk 18.

The sequence of relative distances can be analyzed at a much smaller time scale. Nearly any distinctive signature can be chosen and referred to as a fingerprint. For example, this can be done by high-pass filtering the position data, and selecting the largest feature. The fingerprint can often be chosen at nearly any location around the disk as long as the features are larger than the noise level. The autocorrelation of the fingerprint in one rotation and a candidate sequence disposed approximately one period away is calculated, and the optimum autocorrelation is chosen to locate the adjacent fingerprint and thus the start of the next period or rotation. This process can be repeated for each revolution in the sequence, thus separating the relative distances into patterns representing individual rotations of the disk 18.

Figure 3:
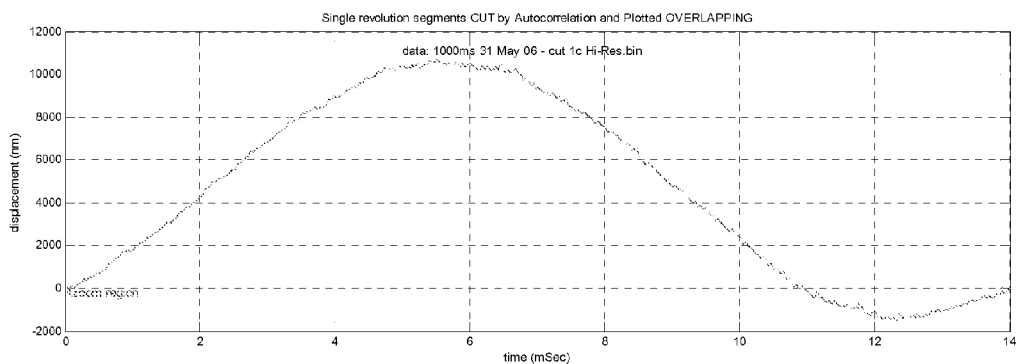
FIG. 3 is a plot of many revolutions worth of data from FIG. 1 after the autocorrelation algorithm has determined the same point in the rotation to break the long plot into individual rotations, which are then laid on top of one another.
Figure 4:
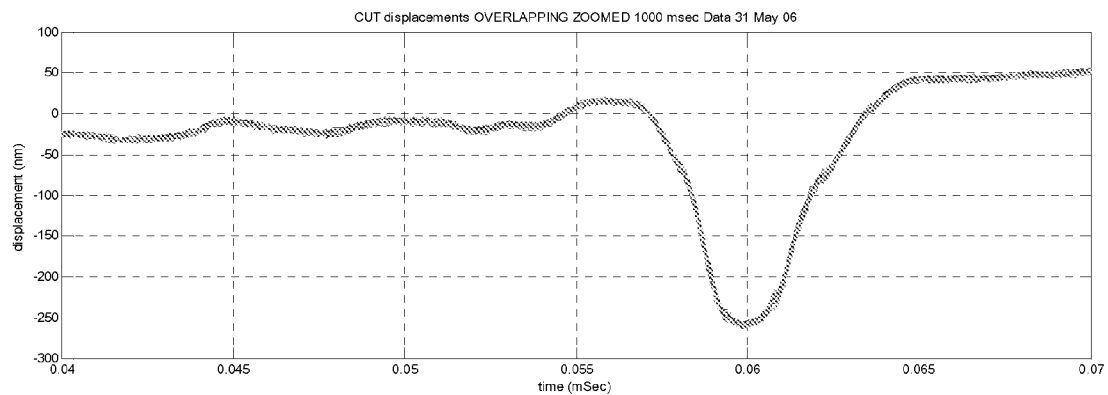
FIG. 4 is a plot of the zoomed rectangle region from FIG. 3, again showing many revolutions worth of data all lying on top of each other, at a scale wherein it is possible to see a few nanometers of non-repeating motion as well as the feature signature used to align the individual data sets.

FIG. 4 shows a plot of multiple thirty-millisecond relative distance sequences that occur an integral number of periods apart from one another after the alignment. As can be seen, there is a relatively significant feature at about six-hundredths of a millisecond on the time scale of the plot. It can also be seen that all of the relative distance components of the one-period arrays tend to follow, relatively closely, the lesser significant wave and bump features. These general features that all of the traces tend to follow are also components of repeatable runout—though much finer components than the sinusoidal component described above. These sequences can often be accurately aligned to within one data point. Interpolative techniques can be used to choose a maximum between two data points, further improving the accuracy. This interpolation can be done using any one or more of a variety of functional forms, as are well known to those skilled in the art of signal processing. By choosing the starting position of each rotation at the same part of the repeating pattern, the data can be separated into multiple one-period arrays, each corresponding with a separate rotation of the disk 18. In general, a one-period array may be comprised of a number of components, each a function of time. The graph in FIG. 3, for example, depicts the distance component of a single one-period array. Using autocorrelation, the one-period arrays are determined without relying on external triggering or synchronization.

There are other similar calculations that are analogous to autocorrelation, and which do not represent a deviation from the spirit of this invention. For example, a set of Fourier transform amplitudes and phases, or a sequence of different order moments could be calculated and compared instead of calculating the sum of the products of each element of a fingerprint and a candidate from a different rotation. Fitting only lower order moments or a limited band of frequencies of amplitudes and phases of the Fourier transform would allow one to tune which kind of features of the fingerprint would be most weighted in determining the optimum autocorrelation.

The apparent width of the fingerprint is not too important, but is preferably long enough to unambiguously identify the selected feature from any other feature that is also disposed in a narrow region that is separated from the selected feature by about one period. However, the fingerprint is preferably not so long as to make the computation of the autocorrelation function excessively time consuming.

The number of data samples in each revolution of data may be different. This may result from motor speed jitter or other factors. The comparison of the components of the one-period arrays can then be done by re-sampling. In a preferred embodiment, the re-sampling results in a common number of points for all one-period arrays.

In practice, the optical signatures at nearly all locations around a disk are unique and capable of being used as fingerprints in an autocorrelation or similar calculation. In some cases it will be very beneficial to calculate the autocorrelation at multiple locations, and resample the region between adjacent locations separately, to take into account changes in speed that occur on time scales shorter than one period. This will result in the same number of points in the corresponding regions of all rotations, ensuring that the total number of points for all rotations will be the same. Alternatively, an analytic function or interpolative technique can be used to smoothly vary the re-sampling density around the disk. In a preferred embodiment, this re-sampling procedure will still result in a common number of points for all one-period arrays. Once all one-period arrays have the same number of points, it is possible to average them all together (FIG. 11) to form the RRO Array.

As seen in FIG. 4, the traces of the individual period segments do not all follow the exact same path, but instead form a fuzzy line along the features of the repeatable runout. The fuzziness of the line is an indication of non-repeatable runout, which is a measure of the position of the disk 18 that is not the same from rotation to rotation. In one embodiment, the non-repeatable runout can also be quantified by subtracting the average of all one-period arrays from each one-period array in turn (see FIG. 11). This produces new one-period arrays (which will be referred to as NRRO arrays) comprised entirely of deviations. An NRRO array can be defined in other ways, such as the above definition multiplied by a scalar or being processed by another monotonic function, without compromising its utility and therefore not deviating from the spirit of the described definition. This new array contains all non-repeatable runout information. Scalars can be calculated from these arrays to assist in determining whether a disk is within specifications or not. One technique involves calculating the maximum of the absolute value of the relative distance component of all NRRO arrays, and comparing it to a maximum allowable value. The root-mean-square of all NRRO arrays is another scalar which could be used to make a disposition decision.

Figure 5:
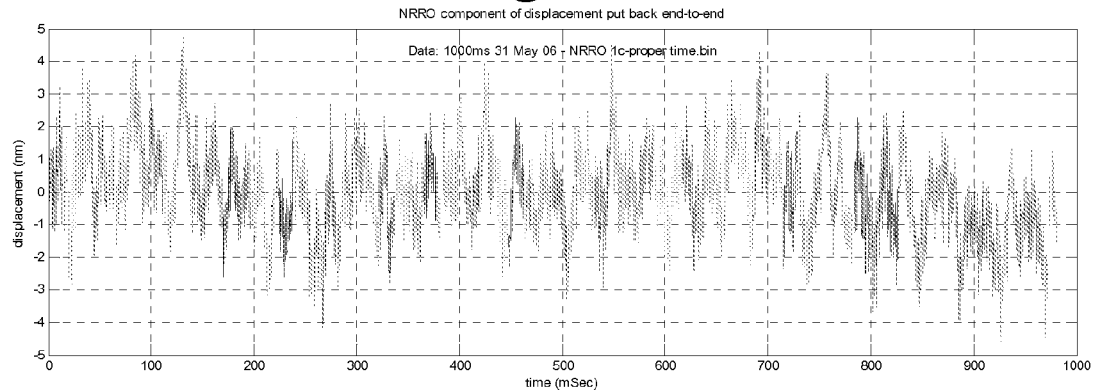
FIG. 5 is a plot of the remaining displacement in the rotating disk after subtracting the average of the many plots of FIG. 3 from each of the plots individually, after which the many curves are then rejoined end to end in the same time sequence they were cut apart from in FIG. 1, depicting the non-repeating portion of the rotating motion, which can now easily be seen as being about eight nanometers, peak-to-peak.

The relative distance components of the NRRO arrays can then be separated one from another (no longer laid on top of one another) and stitched back together into the original time series, as depicted in FIG. 5, to provide an indication of the non-repeatable runout over time, with the repeatable runout components removed from the plot. As can be seen in FIG. 5, the non-repeatable runout varies by a total of about eight or ten nanometers, whereas the repeatable runout—as seen in FIG. 1—varies by a total of about thirteen thousand nanometers. However, repeatable runout, which might all be located in the edge of the disk 18, can often be a smaller problem than non-repeatable runout, which tends to be located at the point of rotation of the disk 18, thus causing the entire disk 18 to shift back and forth. As can be seen, the system 10 allows very small amounts of non-repeatable runout to be measured, providing engineers the tools that they need to find and resolve the causes of such.

This processed non-repeating runout component can be transformed, such as with a fast Fourier transform, to provide a spectral view of the non-repeating runout motion. Alternately, the raw displacement data can be fast Fourier transformed to provide a similar spectral view, but in this case the repeatable runout components will be present in the spectrum as well.

The measurements described herein can be performed on special test dummy disks, or on actual hard disk drive disks with standard rounded edges, or on the motor or bearing surface itself. The measurements can be made at typical operational speeds, such as ten thousand rotations per minute.

Beyond these aspects, one improvement of special interest for non-repeatable runout measurements is provided by the interferometer's high lateral spatial resolution, which in some embodiments is about three microns, with a sampling bandwidth of about ten million samples per second. This allows accurate spatial resolution of inherent surface topography features or applied fiducial marks on the test surfaces. Repeatable detection and resolution of such fingerprints and features enables the use of autocorrelation algorithms, so that the exact rotational position of the object can be determined on each revolution of the object. In this manner, every measurement on every rotation of the surface can be exactly compared to the measurement of that exact same point on any other rotation. Even variations of rotation speed from one rotation to another or within one rotation can be corrected for by autocorrelating on several of these identified fingerprints, spaced at various points around the rotating surface. The interferometer is sensitive enough that the natural texture on a well polished surface is sufficient to generate a definitive autocorrelation result that enables precise determination of the surface position on each revolution.

The data recorded by optical instrumentation is not limited to the relative distance output of interferometers (though that is a preferred embodiment). In other embodiments an interferometer is not used at all. A simple light source and detector may be used to measure only surface reflectivity. As long as the spot size is as small and the sampling rate is as high as that described above, the autocorrelation calculation can be accomplished using the same alignment technique as described above, but with a much lower-cost system than an interferometer. The reflectivity will be a function of the separation between the sensor 14 and the disk 18, and therefore can be used to also characterize the repeatable and non-repeatable runout of a disk 18.

Alternatively, the reflectivity could be used for timing information in order to compensate for motor speed jitter, and a separate tool could be used for relative distance measurement, such as a capacitance probe. When an interferometer is used, the reflectivity can be acquired simultaneously with the relative distance measurement. In fact, the digital representation of analog voltages (the raw data channels) from a multichannel interferometer are the only data that need to be stored, because reflectivity and relative distance can be derived from them. As a result, the phrase data indicative of local characteristics is used herein, because any combination of the raw data channels, intermediate results, relative distance, reflectivity, and auxiliary signals may be recorded. Auxiliary signals may include the output of capacitance probes or some type of triggering signal. Additionally, the phrase one-period array is used herein to represent at least one component: each a function of time selected from the group consisting of raw data channels, reflectivity, relative distance, and auxiliary signals.

It should be reiterated that although the examples recited pertain to rotation, all the principles are useful in any periodic mechanical system.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An article comprising a machine-readable medium embodying information indicative of instructions that when performed by at least one machine result in operations comprising:
   storing data indicative of local characteristics of a body in periodic motion in a time sequence,
   analyzing the data to locate at least one fingerprint in at least one local characteristic,
   selecting at least one fingerprint as at least one position reference, and
   dividing the time sequence of the data into one-period arrays based at least in part on the at least one fingerprint, where each one-period array represents one period of motion of the body.

2. The article of claim 1, wherein the operations further comprise:
   re-sampling the data such that each one-period array has an equal number of data points,
   averaging the one-period arrays to produce an average array, and
   designating the average array as a repeatable runout array.

3. The article of claim 2, wherein the operations further comprise:
   subtracting the repeatable runout array from each one-period array to produce subtracted arrays, and
   designating the subtracted arrays as non-repeatable runout arrays.

4. A method of measuring runout in a moving body, the method comprising:
   positioning a source of electromagnetic radiation that produces an electromagnetic beam relative to the moving body, with the electromagnetic beam directed from the source towards a surface of the moving body,
   positioning an electromagnetic detection system proximate the moving body, such that the electromagnetic beam is reflected by the surface of the moving body and received at a sampling rate by the electromagnetic detection system, where such reception constitutes a measurement of the surface of the moving body,
   performing the measurement of the surface as the moving body moves for at least two periods of motion,
   storing data indicative of local characteristics of the moving body in a time sequence,
   analyzing the data to locate at least one fingerprint in at least one local characteristic,
   selecting at least one fingerprint as at least one position reference, and
   dividing the time sequence of the data into one-period arrays based at least in part on the at least one fingerprint, where each one-period array represents one period of motion of the moving body.

5. The method of claim 4 further comprising the steps of:
   re-sampling the data such that each one-period array an equal number of data points,
   averaging the one-period arrays to produce an average array, and
   designating the average array as a repeatable runout array.

6. The method of claim 5 further comprising the steps of:
   subtracting the repeatable runout array from each one-period array to produce subtracted arrays, and designating the subtracted arrays as non-repeatable runout arrays.

7. The method of claim 4 wherein the local characteristics include at least one of relative distance and reflectivity.

8. The method of claim 4 wherein the local characteristics include relative distance and reflectivity.

9. The method of claim 4, wherein the electromagnetic detection system is an interferometer.

10. The method of claim 4, wherein the at least one fingerprint consists of more than one fingerprint substantially evenly distributed throughout one period along the surface of the moving body forming sub-period arrays associated with sub-periods of the at least two periods of motion.

11. The method of claim 10, wherein the sub-period arrays associated with each period are re-sampled such that each sub-period array for a given period has an equal number of data points.

12. The method of claim 11, wherein the re-sampling is performed using a constant time between data points within each sub-period.

13. The method of claim 11, wherein the re-sampling is performed using a variable time between data points within each sub-period, based at least in part on locations of the more than one fingerprint.

14. The method of claim 4, wherein the sampling rate is greater than one million samples per second.

15. The method of claim 4, wherein the source and detection system together have a spatial resolution of no more than one hundred microns.

16. The method of claim 4, wherein the source and detection system together have a spatial resolution of no more than ten microns.

17. The method of claim 4, wherein the moving body is a rotating member.

18. The method of claim 4, wherein the moving body is a hard disk drive disk.

19. The method of claim 4, wherein the moving body is a fluid bearing.

20. The method of claim 4, wherein the moving body is a translating member that makes multiple passes past the source and detection system during the measurement step.

21. The method of claim 4, wherein the at least one position reference represents a fiducial mark.

22. The method of claim 4, wherein the at least one position reference represents a feature of altered reflectance on the surface.

23. The method of claim 4, wherein the at least one position reference represents an anomaly on the surface.

24. A system for runout characterization, the system comprising:
   a source of electromagnetic radiation that produces an electromagnetic beam relative to a moving body, with the electromagnetic beam directed from the source towards a surface of the moving body,
   an electromagnetic detection system proximate the moving body, such that the electromagnetic beam is reflected by the surface of the moving body and received as information indicative of local characteristics of the moving body in a time sequence,
   memory to store the information indicative of local characteristics of the moving body,
   memory to store instructions,
   a processor configured to,
      execute the instructions to analyze the information indicative of local characteristics of the moving body and to locate at least one fingerprint,
      select at least one fingerprint as at least one position reference, and
      divide the time sequence of the information indicative of local characteristics of the moving body into one-period arrays based at least in part on the at least one fingerprint, where each one-period array represents one period of motion of the moving body.

25. The system of claim 24 wherein the electromagnetic detection system is an interferometer.

26. The system of claim 24 further comprising the moving body.

27. The system of claim 26 wherein the moving body is a rotating member.

28. The system of claim 26 wherein the moving body is a hard disk drive disk.

29. The system of claim 26 wherein the moving body is a fluid bearing.

30. The system of claim 26 wherein the moving body is a translating member that makes multiple passes past the electromagnetic detection system.

31. A system for runout characterization, the system comprising:
   means for directing an electromagnetic beam toward a surface of a moving body, such that electromagnetic beam is reflected by the surface,
   means for receiving the reflected electromagnetic beam at a sampling rate, where such reception constitutes a measurement of the surface of the moving body as the moving body moves for at least two periods of motion,
   means for storing data generated by the measurement, where the data is indicative of local characteristics of the moving body in a time sequence,
   means for analyzing the data to locate at least one fingerprint in at least one local characteristic,
   means for selecting at least one fingerprint as at least one position reference, and
   means for dividing the time sequence of the data into one-period arrays based at least in part on the at least one fingerprint, where each one-period array represents one period of motion of the moving body.

32. The system of claim 31 further comprising:
   means for re-sampling the data such that each one-period array has an equal number of points,
   means for averaging the one-period arrays to produce an average array, and
   means for designating the average array as a repeatable runout array.

33. The system of claim 31 further comprising:
   means for subtracting the repeatable runout array from each one-period array to produce subtracted arrays, and
   means for designating the subtracted arrays as non-repeatable runout arrays.

34. The system of claim 31 wherein the local characteristics include at least one of relative distance and reflectivity.

35. The system of claim 31 wherein the local characteristics include relative distance and reflectivity.

36. The system of claim 31, wherein the means for receiving the reflected electromagnetic beam is an interferometer.

37. The system of claim 31, wherein the at least one fingerprint consists of more than one fingerprint substantially evenly distributed throughout one period along the surface of the moving body.

38. The system of claim 37, wherein the more than one fingerprint are used to form sub-period arrays associated with sub-periods of the at least two periods of motion.

39. The system of claim 37, wherein the sub-period arrays associated with each period are re-sampled such that each sub-period array for a given period has an equal number of data points.

40. The system of claim 38, wherein the re-sampling is performed using a constant time between data points within each sub-period.

41. The system of claim 38, wherein the re-sampling is performed using a variable time between data points within each sub-period, based at least in part on locations of the more than one fingerprint.

* * * * *